United States Patent
Di Carmine et al.

(10) Patent No.: US 12,352,383 B2
(45) Date of Patent: Jul. 8, 2025

(54) ISOSTATIC MOUNTING SYSTEM

(71) Applicant: LEONARDO S.P.A., Pomezia (IT)

(72) Inventors: Emiliano Di Carmine, Pomezia (IT); Luciano Gallazzi, Pomezia (IT); Romano Giovanni Iazurlo, Pomezia (IT); Stefano Beretta, Pomezia (IT); Laura Boniotti, Pomezia (IT); Stefano Foletti, Pomezia (IT); Gianpiero Groppi, Pomezia (IT); Mauro Bracconi, Pomezia (IT)

(73) Assignee: LEONARDO S.P.A., Pomezia (IT)

( * ) Notice: Subject to any disclaimer, the term of this patent is extended or adjusted under 35 U.S.C. 154(b) by 172 days.

(21) Appl. No.: 18/002,889

(22) PCT Filed: Sep. 17, 2021

(86) PCT No.: PCT/IB2021/058508
§ 371 (c)(1),
(2) Date: Dec. 22, 2022

(87) PCT Pub. No.: WO2022/058959
PCT Pub. Date: Mar. 24, 2022

(65) Prior Publication Data
US 2023/0250920 A1    Aug. 10, 2023

(30) Foreign Application Priority Data

Sep. 18, 2020  (EP) ..................................... 20196935
Oct. 15, 2020  (IT) ........................ 102020000024331

(51) Int. Cl.
*A47B 91/00*     (2006.01)
*B22F 5/10*      (2006.01)
(Continued)

(52) U.S. Cl.
CPC ............... *F16M 11/22* (2013.01); *B22F 5/10* (2013.01); *F16M 13/02* (2013.01); *A47B 91/00* (2013.01);
(Continued)

(58) Field of Classification Search
CPC ... A47B 91/00; A47B 91/02; A47B 2013/024; A47B 220/003; F16M 2200/08
(Continued)

(56) References Cited

U.S. PATENT DOCUMENTS 5,439,269 A * 8/1995 Cheng ........................ A47F 5/04
                                                        108/150
6,234,434 B1 * 5/2001 Avinger ................. F16M 11/22
                                                        248/188.7
(Continued)

FOREIGN PATENT DOCUMENTS

CN      207007186 U    2/2018
EP       3593925 A1    1/2020

OTHER PUBLICATIONS

International Preliminary Report on Patentability for International Application No. PCT/IB2021/058508 mailed Jan. 26, 2023.
(Continued)

*Primary Examiner* — Alfred J Wujciak
(74) *Attorney, Agent, or Firm* — Dorsey & Whitney LLP

(57) ABSTRACT

An isostatic mounting system is described to support a sensor and to minimise the thermal conductivity between the sensor and a carrier thereof. An isostatic mounting system comprises at least one support foot configured to be fixed, in use, to a structure of the carrier, and at least one leg extending from the support foot. The support foot is made of a full solid material and the leg has a lattice structure made of the same material of the support foot.

7 Claims, 2 Drawing Sheets

(51) Int. Cl.
*F16M 11/22* (2006.01)
*F16M 13/02* (2006.01)
*B33Y 80/00* (2015.01)

(52) U.S. Cl.
CPC ........... *B22F 2999/00* (2013.01); *B33Y 80/00* (2014.12); *F16M 2200/08* (2013.01)

(58) Field of Classification Search
USPC ............................... 248/188.7, 188.8, 188.9
See application file for complete search history.

(56) References Cited

U.S. PATENT DOCUMENTS

2008/0236308 A1* 10/2008 Liebelt ................ G01M 99/001
73/866.4
2018/0216778 A1 8/2018 Ma et al.
2020/0084901 A1 3/2020 Range et al.

OTHER PUBLICATIONS

International Search Report and Written Opinion from International Application No. PCT/IB2021/058508 mailed Dec. 22, 2021.

Vera, "Use Lattice Structure Instead of Support to Achieve Lightweight and High-strength Design", URL:https:facfox.com/news/use-lattice-structure-instead-of-support-to-achieve-lightweight-and-high-strength-design/ last accessed on Dec. 10, 2021, Apr. 11, 2019, pp. 1-4.

Second Written Opinion from International Application No. PCT/IB2021/058508mailed Aug. 29, 2022.

* cited by examiner

ISOSTATIC MOUNTING SYSTEM

CROSS-REFERENCE TO RELATED APPLICATIONS

This patent application is a U.S. National Stage application of PCT International application no. PCT/IB2021/058508 filed on 17 Sep. 2021, which claims priority from European patent application no. 20196935.9 filed on 18 Sep. 2020 and from Italian Patent Application no. 102020000024331 filed on 15 Oct. 2020, the entire disclosure of each of which is incorporated herein by reference.

TECHNICAL SECTOR OF THE INVENTION

The present invention relates in general to an isostatic mounting system, in particular to an isostatic mounting system configured to support a high-precision sensor, for example a cryogenic-type sensor, or a support bench for a high-precision sensor, to which the following description will make explicit reference without losing generality.

BACKGROUND OF THE INVENTION

High-precision sensors are known to be used, for example, in the space or aeronautic sector.

High-precision sensors of the so-called "cryogenic" type are also known, i.e. that operate at low or very low temperatures normally referred to as "cryogenic" and that are required especially in the above-mentioned space applications.

A typical example of a cryogenic sensor is represented by infra-red sensors, used in the space or aeronautic sector, which need to be kept at extremely low temperatures in order to work properly.

Other types of high-precision sensors for space or aeronautic applications include optical and electro-optical sensors, such as sensors using laser pointing.

As far as space applications are concerned, the sensors of the aforesaid type are typically embedded in satellites of various sizes, which then define the carriers of these sensors and allow them to be used in orbit.

It is well known in the field the need to develop support structures for high-precision sensors that ensure fulfilling the demanding specifications in terms of thermal and mechanical stress and in terms of mass.

In other words, the support structures must ensure the thermal insulation of the sensor with respect to the transport carrier (e.g. the satellite) and, at the same time, a certain rigidity in coupling to the carrier itself in order to preserve the nominal precision and efficiency of the sensor, while further respecting the mass limits imposed by the fact that taking a satellite into orbit is expensive and, consequently, any possible reduction in weight entails a significant reduction in costs.

In this respect, support structures for high-precision sensors are known as comprising at least one support bench adapted to support one or more high-precision sensors and at least one isostatic mounting system, configured to couple the support bench to the carrier structure and, thus, fix the sensor to the carrier.

Normally, isostatic mounting systems are mounted to a wall located in an inner compartment of the carrier within which the sensor will be housed.

The use of isostatic mounting systems is particularly advantageous since, as it is well known, isostatic structures make it possible to withstand thermal stresses without generating states of internal co-action.

Typically, isostatic mounting systems comprise at least one central part, or leg, and at least one end portion defining a support foot fixing the central part to the (inner) wall of the carrier.

Usually, the leg is fixed to the support foot and extends from the latter to a portion of the support located at the opposite end of the leg from that fixed to the support foot. The support portion is then fixed, in turn, to the support bench or defines in itself a support bench for the sensor.

Generally, known isostatic support devices are made by joining the central part (leg) made of composite material (e.g. carbon fibre reinforced polymers or glass fibre reinforced polymers) to minimise the thermal conductivity, and end portions (support foot and support portion) made of full solid metal material (e.g. titanium or titanium alloys) to ensure adequate coupling stiffness.

OBJECT AND SUMMARY OF THE INVENTION

The Applicant has found that, although considered as satisfactory in many respects, there is room for improvement in the known isostatic mounting systems in terms of production costs, the need to ensure an optimal joint between the composite and full solid metal parts, and the relation between the stiffness and mass of the device itself.

Aim of the present invention is therefore to make an isostatic mounting system which is highly reliable and cheap, and which allows to obtain at least some of the improvements specified above and related to the isostatic mounting systems of the known type.

According to the invention, this aim is reached by an isostatic mounting system as claimed in the appended Claims.

DETAILED DESCRIPTION OF PREFERRED EMBODIMENTS OF THE INVENTION

The following description is given to enable a person skilled in the art to make and use the invention. Various modifications to the embodiments will be readily apparent to those skilled in the art, without departing from the scope of protection of the present invention as claimed. Therefore, the present invention should not be considered as limited to the embodiments shown and described, but should be granted the broadest scope of protection consistent with the features described and defined in the appended claims.

Unless otherwise defined, all the technical and scientific terms used herein have the same meaning as commonly understood by a person skilled in the art to which the described embodiments belong. In case of conflict, this disclosure including definitions shall apply.

In order to facilitate understanding of the embodiments described herein, reference will be made to some embodiments and a specific language will be used to describe them. The terminology used herein is intended to describe only particular embodiments and is not intended to limit the scope of protection of this disclosure.

Figure 1:
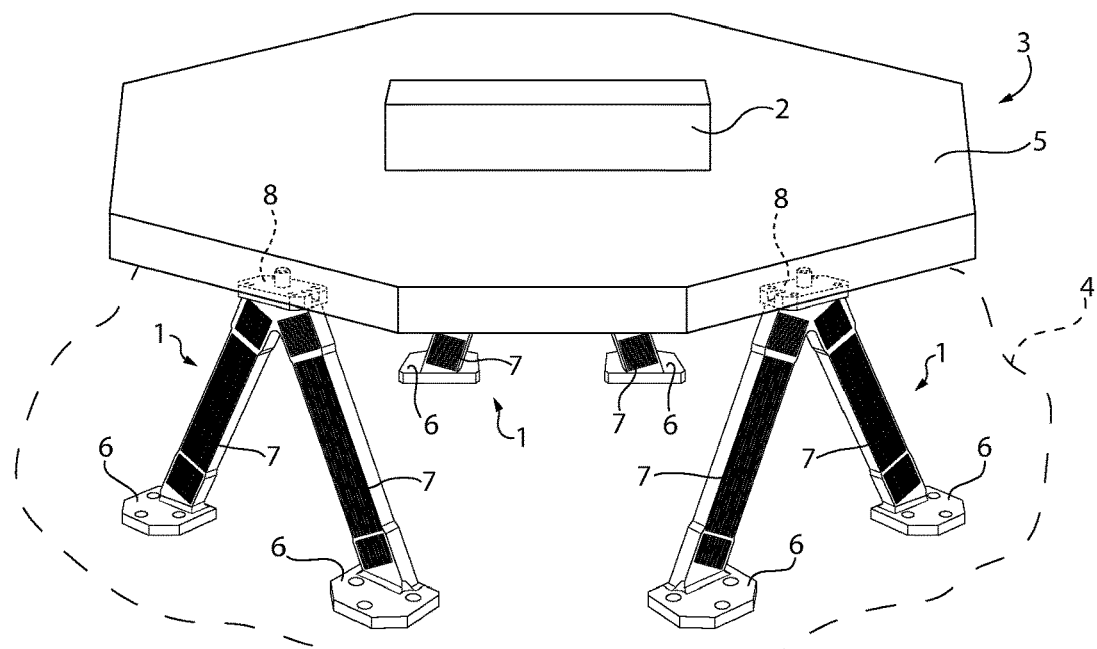
FIG. 1 is a perspective view, with parts removed for clarity, of a support structure for a sensor element, in particular a high-precision sensor, including a plurality of isostatic mounting systems made according to the present invention.
Figure 2:
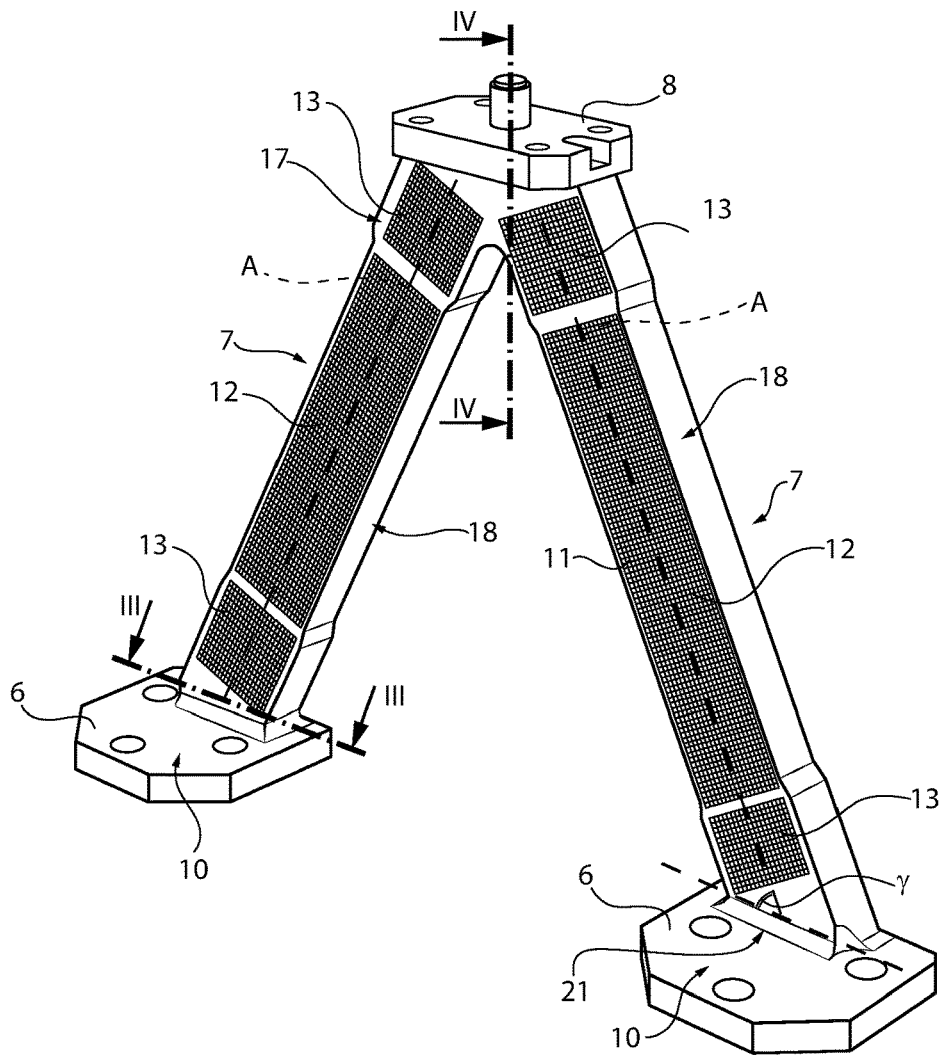
FIG. 2 shows, on an enlarged scale and with parts removed for clarity, an isostatic mounting system of the type shown in FIG. 1.

Referring to FIGS. 1 and 2, number 1 globally denotes an isostatic mounting system configured to support a sensor element 2 and to minimise the thermal conductivity between the sensor element 2 and a carrier (not shown).

In particular, the present description will explicitly refer, without losing generality, to an isostatic mounting system 1 configured to support a high-precision sensor 2, for example a cryogenic-type sensor for space applications, or a support bench for a high-precision sensor 2.

It should be noted that the term "cryogenic sensor" refers, in this description and in the claims, to a sensor operating at low or very low temperatures commonly known as "cryogenic".

According to this preferred and non-limiting embodiment, the sensor 2 is a high-precision cryogenic sensor used in the aerospace field and capable of being fixed, in use, to a satellite carrier (i.e. a satellite).

Preferably, the sensor 2 could be an infra-red sensor, an optical sensor or an electro-optical sensor for space or aeronautic applications.

The isostatic mounting system 1 is part of a more complex support structure 3 intended to fix the sensor 2 to a structure of the carrier, in particular a support surface 4 of the carrier, in particular a floor, and comprising a plurality of isostatic mounting systems 1 (FIG. 1).

In the example described, the support structure 3 comprises three isostatic mounting systems 1 which are equidistant from each other, in particular arranged substantially at $120c$ from each other.

The support structure 3 further comprises a support bench 5 adapted to be fixed to the isostatic mounting system 1 and to support the sensor 2, or a plurality of sensors 2 which are equal or different from each other.

According to an alternative embodiment not shown, the support structure 3 may be defined by a single isostatic mounting system 1 which can be fixed to the support surface 4 of the carrier and directly supporting the sensor 2, without interposing a support bench 5.

For the sake of brevity, reference will be made below to a single isostatic mounting system 1. However, the structural and functional characteristics described regarding this isostatic mounting system 1 are applicable to each isostatic mounting system 1 of the support structure 3.

As visible in FIG. 2, the isostatic mounting system 1 comprises at least one support foot 6, in particular two support feet 6 configured to be fixed, in use, to the support wall 4 of the carrier, and at least one leg 7, in particular two legs 7, each one extending from a respective support foot 6.

In other embodiments not shown, the isostatic mounting system 1 may comprise a single support toot 6 and a single leg 7, or a number of support feet 6 and legs 7 greater than two.

Each support foot 6 comprises a support surface (not shown in the accompanying Figures) configured to cooperate in contact with, in particular to be fixed to, the support surface 4 of the carrier, and a flat surface 10 opposite the support surface 4.

More particularly, each leg 7 extends from the relative flat surface 10 along a longitudinal axis A, which is rectilinear in the non-limiting example shown and described herein.

More precisely, each longitudinal axis A is tilted, with respect to the relative flat surface 10, by a non-zero acute angle 7, so that the legs 7 converge towards each other.

The isostatic mounting system 1 further comprises a support plate 8 arranged opposite to the support feet 6, more specifically fixed to each leg 7 opposite to the support feet 6, and configured to support the support bench 5.

In detail, the support plate 8 is fixed to both legs 7 at the end of each leg 7 opposite the end fixed to the respective support foot 6.

In other words, the legs 7 extend from the support feet 6 and converge towards the support plate 8. In practice, the isostatic mounting system 1 is defined by a two-legged support whose legs 7 are tilted at an angle γ so as to converge towards each other and ending at the support plate 8.

According to an alternative embodiment not shown, the support plate 8 may be configured to directly support the sensor 2, thus defining, in itself, a support bench for the sensor 2.

It is known in the field to develop support structures 3 that ensure that they can withstand the mechanical and thermal stresses from the environment outside the sensor 2.

Support structures 3 must not only ensure compliance with the expected specifications in terms of thermal and mechanical stresses, but also guarantee compliance with the equally important mass limits, which are particularly demanding for space and aerospace applications.

In other words, the support structure 3 must ensure the thermal insulation of the sensor 2 with respect to the carrier and, at the same time, a certain stiffness in coupling to the carrier itself in order to preserve the nominal precision and efficiency of the sensor 2, while respecting the predetermined mass limits.

In this respect, according to an important aspect of the present invention, each support foot 6 is made of a full solid material and each leg 7 has a lattice structure 11 made of the same material of the support feet 6.

It should be noted that the term "full solid material" refers, in this disclosure and in the attached claims, to a portion of material having a zero or negligible percentage of voids over solids, or in any case not appreciable to the naked eye or at a microscopic level.

By contrast, the term "lattice structure" refers, in the present description and in the appended claims, to a portion of material having an appreciable percentage of voids over solids, in particular appreciable to the naked eye.

Conventionally, the aforesaid material is a metallic material, e.g. titanium, a titanium-based alloy, or an invar alloy, i.e. a metal alloy containing iron, nickel and traces of carbon and chromium.

Thus, in the case of titanium, each support foot 6 is made of solid titanium, i.e., with a negligible percentage of voids over solids in the material, while the legs 7 are made of titanium and have a lattice structure 11, i.e., have a non-negligible percentage of voids over solids in the material.

Preferably, the material is defined by the metal alloy Ti-6Al-4V.

In the example described, the support portion 8 is also made of full solid material.

In view of the above, it is possible to identify an axial "series" configuration (along each axis A) of the isostatic mounting system 1 as regards the material structure: the support feet 6 are made of full solid material, the legs 7 are made of material having a lattice structure H, and the support plate 8 is made of full solid material.

This structural configuration is particularly advantageous as it allows to minimise the thermal conductivity between the carrier, i.e. the support surface 4 of the carrier, and the sensor 2, while providing an adequate coupling between the sensor 2 and the carrier in terms of stiffness.

Furthermore, since the legs 7 have a lattice and non-solid structure 11, the density of the legs 7 is lower than that of the full solid material constituting the support feet 6 and the support portion 8. This results in a reduced total mass of the isostatic mounting system 1, and therefore lower overall costs, without sacrificing an adequate coupling stiffness.

Advantageously, the support feet 6 and legs 7 are made in a single piece without solution of continuity.

In particular, the support portion 8 is also made in a single piece with the legs 7 and the support feet 8 without solution of continuity.

The isostatic mounting system 1 is therefore made entirely in one single piece, preferably by additive manufacturing (e.g. 31) printing, sintering, etc.).

As particularly visible in FIG. 2, each leg 7 comprises a central portion 12 and two end portions 13 arranged on axially opposite sides of the central portion 12, with respect to the axis A.

More specifically, one of the end portions 13 extends from the respective support foot 6, the other of the end portions 13 is fixed (in the present case integrally connected without solution of continuity) to the support plate 8.

Conveniently, the lattice structure 11 of the central portion 12 has a relative density, defined as the ratio between the density of the lattice structure 11 at any point of the leg 7 and the density of the full solid material, lower than the relative density of the end portions 13.

In greater detail, the above defined relative density of the lattice structure 11 at the end portions 13 has a value ranging from 25% to 35%, preferably from 28% to 32%, even more preferably 31.3%.

Similarly, the relative density of the lattice structure 11 at the central portion 12 has a value ranging from 20% to 30%, preferably from 22% to 26%, even more preferably 24.7%.

The values set forth above have been identified by the Applicant, through an extensive experimental campaign, as the optimal relative density values of the lattice 11 structure of the legs 7 as regards the thermal conductivity.

In addition, the fact that the end portions 13 have a greater relative density than the relative density of the central portion 12 makes it possible to achieve an excellent thermal insulation of the sensor 2 while ensuring adequate coupling stiffness.

Figure 5:
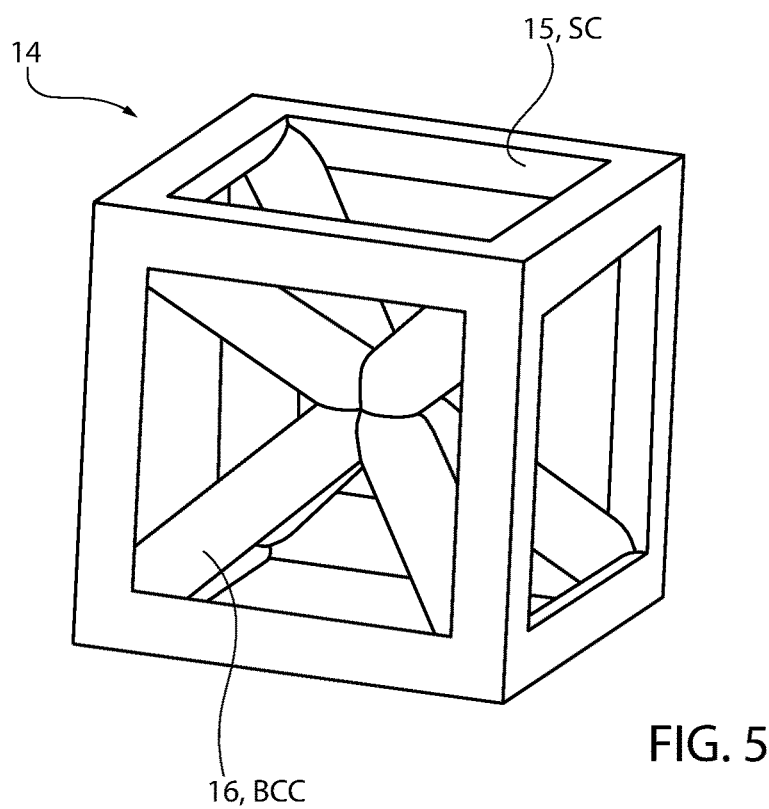
FIG. 5 is a schematic view, on an enlarged scale, of a unitary cell of a lattice structure, in particular a lattice micro-structure, of the isostatic mounting system of FIG. 2.

According to another aspect of the present invention, the lattice structure 11 is defined by a micro-structure, preferably visible to the naked eye, comprising a plurality of unitary cells 14 adjacent to each other, one of which is schematically, shown in FIG. 5.

In particular, each unitary cell 14 comprises a truss, i.e. a beam structure, having:
- a first structure 15 wherein the beams are defined by the edges of a cube; and
- a second structure 16 in which the beams are defined by the diagonals of the same cube.

More specifically, the truss of each unitary cell 14 is defined by the combination of a simple cubic structure SC ("simple cubic"), defined by the first structure 15, and a body cantered cubic structure BCC ("body cantered cubic"), defined by the second structure 16.

In practice, as shown in FIG. 5, the body cantered cubic structure BCC is embedded within the simple cubic structure SC.

The Applicant has been able to observe, by means of an extensive experimental campaign, that this conformation of the unitary cells 14 composing the lattice structure 11 is the one having the best relationship between mechanical properties and relative density, i.e. between mechanical properties and thermal insulation properties.

Preferably, the cross-sectional area (diameter) of the beams (micro-beams) comprising the first structure 15 may be different from the cross-sectional area (diameter) of the beams (micro-beams) composing the second structure 16. Thanks to this innovative solution, the relative density decreases faster than the mechanical properties and, therefore, all the above-listed requirements in terms of mass, stiffness and thermal conductivity can be met and improved.

According to a further aspect of the present invention, each leg 7 comprises, at least in correspondence with part of its outer lateral surface, a skin 17 made of said full solid material and covering the lattice structure 11 in correspondence with said part.

In the non-limiting example herein described, each leg 7 has a cross-section, with respect to the relative axis A, with a quadrangular shape, in particular rectangular.

Conveniently, the skin 17 of full solid material covers the lattice structure 11 of the legs 7 only at the short sides of the cross-section.

In other words, the skin 17 covers each leg 7 only at the lateral surfaces 18 defining the short sides of the aforesaid cross-section.

Preferably, in each leg 7, the skin 17 has a variable thickness along the axis A.

In detail, the skin 17 at the end portions 13 is thicker than the skin 17 at the central portions 12.

In greater detail, the skin 17 at the end portions 13 has a thickness ranging from 2 mm to 4 mm, preferably 3 mm, while the skin 17 at the central portions 12 has a thickness ranging from 0.5 mm to 2.5 mm, preferably 1.5 mm.

The presence of the skin 17 according to the configuration described above, provides the isostatic mounting system 1 with an adequate stiffness, while ensuring, thanks to the presence of the aforementioned lattice structure 11, the thermal insulation and mass reduction requirements.

Furthermore, the Applicant has been able to observe, by means of an extensive experimental campaign, that the aforesaid values of skin thickness 17 are those which define the best ratio between mass reduction and strength to mechanical stress.

In addition, thanks to the presence of the skin 17, it is possible to identify a "series" configuration transversely to each axis A as regards the material: the skin 17 covering the lateral surfaces 18 is made of a full solid material, while the portion of the leg 7 comprised between the lateral surfaces 18 has a lattice structure 11.

Preferably, each leg 7 has a cross-section at the end portions 13 greater than the cross-section at the central portion 12.

Figure 3:
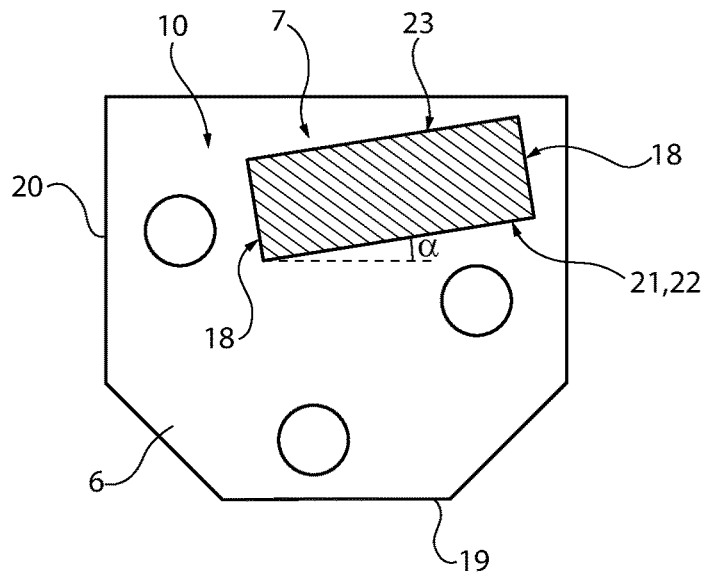
FIG. 3 is a section view along the line III-III of FIG. 2.
Figure 4:
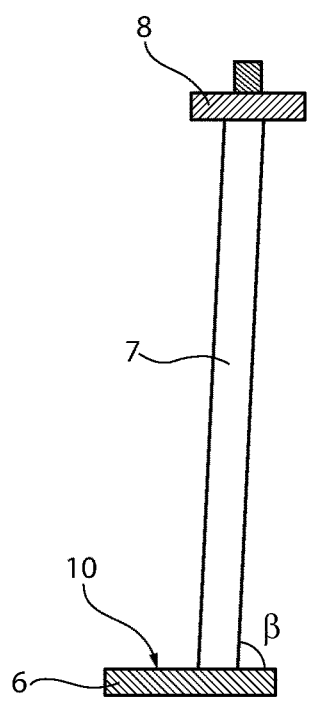
FIG. 4 is a section view along the line IV-IV of FIG. 2.

As visible in particular in FIG. 3, the flat surface 10 of each support foot 6 has at least two sides 19, 20 orthogonal to each other.

In particular, each support foot 6 has a profile (seen in plan) defined by a rectangle surmounted by an isosceles trapezium having as its larger base one of the long sides of the rectangle.

In the present description, the side 19 is defined by the smaller base of the isosceles trapezoid and the side 20 is defined by one of the short sides of the rectangle, as shown in FIG. 3.

Advantageously, for each leg 7, the line of intersection 21 (FIG. 2) between the lateral surface 22 of the leg defining in the cross-section of the relative leg 7 one of the two long sides, and the relative flat surface 10 is tilted by a non-zero acute angle α with respect to one 19 of the two orthogonal sides 19, 20 of the flat surface 10 facing the lateral surface 22.

In practice, each lateral surface 22 is tilted by the aforementioned angle α with respect to the side 19.

In other words, each lateral surface 22 is tilted by the angle α with respect to a plane orthogonal to the flat surface 10 and parallel to the side 19 and, therefore, orthogonal to the side 20.

In addition, each lateral surface 23, opposite to the lateral surface 22 and defining in the aforesaid cross-section of the relative leg 7 the other of the two long sides, is inclined with respect to the relative flat surface 10 by a non-zero acute angle β.

In other words, each leg 7 is tilted towards the side of the relative flat surface 10 parallel to the side 19, i.e. towards the side defining the long side of the aforesaid rectangle.

Preferably, the angle α ranges from 0.5° to 2.5°, in particular is equal to 1.34°.

Preferably, the angle β ranges from 88.5° to 89.5°, in particular is equal to 89.30°.

The Applicant has been able to observe, by means of an extensive experimental campaign, that the aforesaid particular arrangement of each leg 7 represents the optimal positioning in terms of resistance to mechanical stresses.

Examining the characteristics of the isostatic mounting system 1 made according to the present invention, the advantages that it allows to obtain are evident.

In particular, thanks to the above-described structural configuration, the isostatic mounting system 1 provides an adequate thermal insulation of the sensor 2 with respect to the carrier, i.e. with respect to the wall 4 of the carrier, while ensuring an optimal coupling stiffness between them.

Furthermore, since the isostatic mounting system 1 is made entirely in one single piece without solution of continuity and using a single material, critical points, in terms of internal material strains, such as joints and couplings between parts made of different materials, are eliminated or at least reduced. The production process is also simplified, resulting in lower production costs for the isostatic mounting system 1.

In addition, thanks to the effective thermal insulation provided by the lattice structure 11, it is possible to minimise the power absorbed for cooling the sensor 2. This results in a significant energy saving, which, especially for space applications, is a very restrictive requirement and a growing interest issue.

Finally, it is clear that parameters such as the relative density of the lattice structure 11, the diameter of the beams (micro-beams) of the first structure 15 and of the second structure 16, the thickness of the skin 17, the angles α, β and γ can be set according to different combinations, depending on the specific boundary conditions that are outlined in fixing and supporting the sensor 2 to the relevant carrier. This makes it possible to produce an isostatic 1 mounting system optimised to meet a wide range of thereto-mechanical performances.

The invention claimed is:

1. An isostatic mounting system, comprising:
   at least one support foot configured to be fixed, in use, to a structure of a carrier; and
   at least one leg extending from the foot, the at least one leg extending along a longitudinal axis and comprises a central portion and two end portions arranged at axially opposite sides of the central portion, one of the two end portions extending from the foot;
   wherein the foot is made of a full solid material and the at least one leg has a lattice structure made of the same material of the foot; and
   wherein the lattice structure of the central portion has a relative density, defined as a ratio between the density of the lattice structure and the density of the full solid material, less than the relative density of the end portions;
   the isostatic mounting system further comprising a support portion fixed to the at least one leg opposite to the foot and configured to support a sensor;
   wherein the support portion is made of said full solid material.

2. The isostatic mounting system of claim 1, wherein the foot and the at least one leg are made in one single piece without interruption of continuity, by additive manufacturing.

3. The isostatic mounting system of claim 1, wherein the lattice structure is defined by a plurality of unitary cells adjacent to one another, each unitary cell comprising a truss having:
   a first structure in which the beams of the truss are defined by the edges of a cube; and
   a second structure in which the beams are defined by the diagonals of the same cube.

4. The isostatic mounting system of claim 3, wherein the truss of each unitary cell is defined by the combination of a simple cubic structure, defined by said first structure, and a body-centred cubic structure, defined by the second structure and incorporated within the simple cubic structure.

5. The isostatic mounting system of claim 1, wherein the at least one leg comprises, at least at a part of its outer lateral surface, a skin made of said full solid material and covering the lattice structure at said part.

6. The isostatic mounting system of claim 5, wherein the at least one leg extends along a longitudinal axis and comprises a central portion and two end portions arranged at axially opposite sides of the central portion, one of the two end portions extending from the foot;
   the skin covers at least part of the outer lateral surface of the central portion and at least part of the outer lateral surfaces of the end portions;
   the skin which covers the at least one leg at the end portions has a thickness greater than the skin covering the at least one leg at the central portion.

7. The isostatic mounting system of claim 1, wherein the at least one support foot includes at least two support feet and the at least one leg includes two legs, each of the at least two support feet comprising a support surface configured to be fixed, in use, to the structure of the carrier, and a flat surface opposite to the support surface;
   each of the two legs extending from one relative flat surface along a longitudinal axis tilted, with respect to the relative flat surface, by a first non-zero acute angle, so that the two legs converge towards one another;
   each flat surface having at least two sides orthogonal to one another;

each of the two legs having an elongated quadrangular cross-section, with two long sides parallel and opposite to one another and two short sides parallel and opposite to one another;

wherein, for each of the two legs, the intersection line between a first lateral surface of the leg, defining in said cross-section one of the two long sides, and the relative flat surface is tilted by a second non-zero acute angle with respect to one of the two said orthogonal sides facing the first lateral surface itself; and wherein each of the two legs comprises a second lateral surface opposite to the first lateral surface and defining in said cross-section the other of the two long sides, and tilted, with respect to the relative flat surface by a non-zero acute angle.

* * * * *